Patented Sept. 20, 1932

1,878,206

UNITED STATES PATENT OFFICE

JULIUS E. UNDERWOOD AND CHARLES A. CABELL, OF WASHINGTON, DISTRICT OF COLUMBIA, ASSIGNORS TO NATIONAL LIME ASSOCIATION, A CORPORATION OF THE DISTRICT OF COLUMBIA

LIME MIXTURE

No Drawing. Application filed October 29, 1926. Serial No. 145,097.

This invention relates to plastics and more particularly to improved plaster compositions having quick initial set and high tensile strength.

Hydrated lime and lime putty possess properties which recommend their use for plastering purposes. The major objection to these substances for plastering and similar construction work resides in the fact that they do not possess any quick initial setting properties. When hydrated lime is used for this purpose, it requires from twenty to twenty-four hours before the material has acquired such a firm texture as will sustain a second coat. To overcome this disadvantage, it has been proposed to add substances to the lime not only to decrease the initial setting time but also to increase the tensile strength.

It is sometimes advantageous to prepare a dry mixture of hydrated lime, or equivalent material, in which is incorporated substances which impart the desired properties, such as quick initial set and a relatively high tensile strength. These mixtures may be made up and shipped to the place of use, since they require only the addition of water to make the plaster. Such dry mixtures, however, have the outstanding disadvantage of gradually deteriorating during storage so that in many cases after an extended storage period the plaster, resulting from the addition of water, is lacking in strength and has a higher setting time than a freshly made batch. It is therefore an object of this invention to provide a dry lime mixture which retains its potential tensile strength over an extended storage period.

Another object of this invention is to provide a treatment for a lime plaster addition agent whereby deterioration during storage is prevented.

A further object is to provide a process for preserving the quick setting properties of a dry lime mixture.

An additional object is to provide a treatment for a dry lime mixture having incorporated a strength imparter and an accelerator whereby the addition agents are preserved during an extended storage period.

As described in Patent No. 1,656,984, a plastic material having the properties of quick initial set and high tensile strength may be prepared by incorporating with hydrated lime, or similar alkaline earth material, known amounts of a carbonate, sulphate, aluminate and sugar. We have discovered that when an aluminous constituent is treated with an oleaginous substance, the deleterious effect ordinarily resulting from storage is prevented.

The preferred embodiment of the invention is in the addition of a small amount of an oleaginous material to the aluminous constituent, the resulting product being subsequently incorporated with the hydrated lime, carbonate, sulphate and sugar mixture. It is to be understood that the oil may be added to the entire mixture as such, or to one of the other constituents, that is to say the invention is not limited to the treatment of the aluminate with oil. A specific example of the present invention is given hereinafter. This is merely an illustration and is not exclusive but is to be considered as exemplifying the underlying principle of the invention, which is considered as residing in the conception of incorporating a preservative with a mixture of the general character described to thereby prevent deterioration.

To the aluminous constituent, such as calcium aluminate, we add a small amount of a saponifiable oil, such as linseed oil, cottonseed oil or peanut oil and by suitable mixing thoroughly incorporate the two. The resulting oil treated aluminate is then mixed with the hydrated lime and other addition agents as described in the patent referred to. In this mixture the principal function of the oil or equivalent oleaginous substance apparently is to protect the aluminous addition agent from moisture and thereby insure a non-deleterious storage. We prefer to use a saponifiable oil for the reason that it gives a "fat" mix, that is to say a plaster which has a high degree of plasticity. A non-saponifiable oil, however, may be used and serves well as a protective agent, but the plaster obtained from such mix does not possess the plasticity of that in which a saponifiable oil is used.

The following table serves to illustrate the advantages obtained when a plaster mix, having potential properties of quick initial set and high tensile strength, is treated according to our method. In this table the time of set is given in hours and minutes and the tensile strength in pounds per square inch at the designated periods of storage. The tensile strength, as determined by the Gillmore needle test, is taken twenty-four hours after the lime mixture is made up into the plaster.

| Per cent of calcium aluminate | Per cent of aluminum sulphate | Per cent of whiting substitute | Per cent of stone | Per cent of sugar | Per cent of oil | Age days | Time of set hr. min. | Tensile str. 24 hr. lbs. per sq. in. |
|---|---|---|---|---|---|---|---|---|
| 5* | .5 | 2 | 30 | .3 |  | Fresh | 2:50 | 30 |
|  |  |  |  |  |  | 134 | 3:10 | 28 |
|  |  |  |  |  |  | 351 | 5:10 | 13 |
| 5* | .5 | 1 | 30 | .3 | 2 | Fresh | 3:00 | 18 |
|  |  |  |  |  |  | 134 | 3:15 | 28 |
|  |  |  |  |  |  | 351 | 3:00 | 31 |

* Sufficient hydrated lime to make 100%.

From this table it will be seen that an untreated mix, that is one to which no oil has been added, after storage requires a greater setting time. The storage period in addition causes a great loss in the final tensile strength. Thus a mixture which has not been treated with oil when freshly made has a tensile strength of thirty pounds per square inch. A sample of the same material after a storage period of one hundred and thirty-four days shows a decrease in strength. At the expiration of approximately a year, the tensile strength has decreased to thirteen pounds, or less than half of the original strength. Similarly, as the storage period increases the setting time of the plaster product increases. Whereas the plaster made from a fresh mixture has an initial set of two hours and fifty minutes, this material after a year's storage period requires a setting time of over five hours.

A mixture in which the aluminate constituent has been pretreated with two per cent of oil, after a storage period of one hundred and thirty-four days has an initial setting time of three hours and fifteen minutes and a tensile strength of twenty-eight pounds. After three hundred and fifty-one days storage the plaster made from the preserved dry mixture possesses a tensile strength of over thirty pounds. This characteristic effect of the oil in serving to maintain a high tensile strength obtains at all periods of storage. In addition the described treatment serves to protect the quick setting properties, for, as shown in the tables, after approximately one year's storage the initial setting time is as low as that of a freshly made batch.

We prefer to use oil up to approximately two per cent or one-tenth of one per cent of the aluminous constituent of the total mix. We have found by experiment that this is a very satisfactory percentage, but it is to be understood that in practice the amount may be varied somewhat, depending upon the particular mixture to which it is added. The beneficial result accruing from the oil treatment is not dependent upon the particular quantity of oil added.

It is to be understood that while we have described an oil treatment of an aluminous constituent of a lime, aluminate, carbonate, sulphate mixture, the invention is not limited to the treatment of this particular substance or the illustrative mixture. We conceive our invention as residing broadly in the production of a dry lime mix comprising a lime base, a strength imparter and an accelerating agent which resists deteriorating effects of storage and retains its property of imparting to the finished plaster a high tensile strength and a relatively quick initial set.

We claim:

1. A composition of matter comprising hydrated lime, a carbonate, a sulphate, sugar and an oil treated aluminous material.

2. A composition of matter comprising hydrated lime, a carbonate, a sulphate, sugar and an oil treated aluminate.

3. A composition of matter comprising hydrated lime, a carbonate, a sulphate, sugar, and oil treated calcium aluminate.

In testimony whereof we affix our signatures.

JULIUS E. UNDERWOOD.
CHARLES A. CABELL.